US009279480B2

(12) United States Patent
Antal et al.

(10) Patent No.: US 9,279,480 B2
(45) Date of Patent: Mar. 8, 2016

(54) MULTI-SPEED GEAR SYSTEM

(75) Inventors: Christian Antal, Oslo (NO); Knut Tore Ljøsne, Oslo (NO)

(73) Assignee: CA TECHNOLOGY SYSTEMS AS, Oslo (NO)

( * ) Notice: Subject to any disclaimer, the term of this patent is extended or adjusted under 35 U.S.C. 154(b) by 18 days.

(21) Appl. No.: 14/003,885

(22) PCT Filed: Mar. 5, 2012

(86) PCT No.: PCT/NO2012/050035
§ 371 (c)(1),
(2), (4) Date: Sep. 9, 2013

(87) PCT Pub. No.: WO2012/128639
PCT Pub. Date: Sep. 27, 2012

(65) Prior Publication Data
US 2013/0345013 A1    Dec. 26, 2013

(30) Foreign Application Priority Data

Mar. 10, 2011 (NO) .................................. 20110374

(51) Int. Cl.
*F16H 3/78* (2006.01)
*B62M 11/16* (2006.01)
*B62M 11/18* (2006.01)

(52) U.S. Cl.
CPC ................. *F16H 3/78* (2013.01); *B62M 11/16* (2013.01); *B62M 11/18* (2013.01)

(58) Field of Classification Search
CPC .... B62M 11/14; B62M 11/145; B62M 11/16; B62M 11/18; B62M 9/04; B62M 9/06; B60B 27/02; B60B 27/023; B60B 27/026; F16H 3/44; F16H 3/46; F16H 3/62; F16H 3/66; F16H 57/0018; F16H 57/0025
See application file for complete search history.

(56) References Cited

U.S. PATENT DOCUMENTS

| | | | | |
|---|---|---|---|---|
| 5,083,991 | A | * | 1/1992 | Yang ............................. 475/259 |
| 5,273,500 | A | | 12/1993 | Nagano |
| 5,399,128 | A | | 3/1995 | Nürnberger |
| 5,527,230 | A | | 6/1996 | Meier-Burkamp |
| 6,048,287 | A | * | 4/2000 | Rohloff ......................... 475/297 |
| 6,123,639 | A | * | 9/2000 | Schlumpf ...................... 475/269 |
| 2002/0183159 | A1 | * | 12/2002 | Okochi ......................... 475/269 |
| 2005/0197230 | A1 | | 9/2005 | Steuer et al. |
| 2007/0045080 | A1 | | 3/2007 | Urabe |

FOREIGN PATENT DOCUMENTS

CH    393952 A    6/1965
DE    4142867 A1    7/1992

(Continued)

*Primary Examiner* — Jacob S Scott
(74) *Attorney, Agent, or Firm* — Birch, Stewart, Kolasch & Birch, LLP

(57) ABSTRACT

A robust and reliable multi-speed gear system for use on pedally or other manually propelled vehicles, comprising simple epicyclical sections 82, 83, 23 in a complex structure, an internal axial tunnel enabling use of a detachable, vertical shear force load carrying through-bolt 15, a rotatable shift axle 25, a main shaft 7 non-rotatably mounted to the vehicle frame 10, axially floating shift mechanisms 20, 22, 65, and a hub shell 1 fully enclosing the gear mechanisms. The multi-speed hub is robust, light, easily manufactured, offers many speeds and great gear width, and is rigidly securable to the vehicle frame.

17 Claims, 8 Drawing Sheets

(56) References Cited

FOREIGN PATENT DOCUMENTS

| DE | 4203509 | A1 | 8/1993 |
| DE | 4342347 | C1 | 2/1995 |
| DE | 19745419 | A1 | 4/1998 |
| DE | 19720796 | A1 | 11/1998 |
| DE | 199 27 700 | A1 | 12/2000 |
| DE | 102004011052 | A1 | 9/2005 |
| DE | 202010012075 | U1 | 11/2010 |
| EP | 0 926 057 | A2 | 6/1999 |
| EP | 2008927 | A1 | 12/2008 |
| WO | 2009/151334 | A1 | 12/2009 |

* cited by examiner

MULTI-SPEED GEAR SYSTEM

BACKGROUND OF THE INVENTION

The present invention relates to epicyclical multispeed internally geared hubs for bicycles, tricycles and other wholly or partially pedally or otherwise manually propelled vehicles. The advance of the sport of mountain biking has brought with it a need for gear units with a broad selection of different speeds for use in particularly mountainous terrain, sufficiently robust for use in rough terrain, and with features enabling high performance in competitive application. However, a problem herein lies in that internally geared hubs of today are not in these regards considered attractive. Such hubs are limited by their insufficient robustness, number of speeds, gear width, lateral rigidity, number of gear ratio alternatives, ease of operation, and their complexity and manufacturing costs. The present invention provides a hub gear that overcomes these issues.

DESCRIPTION OF PRIOR ART

Rigidity in the rear frame of the pedally propelled vehicle is imperative for performance-oriented use in rough terrain. The rear wheel on a mountain bike used in rough terrain is exposed to higher and more sudden lateral forces than a road or urban bike used on pavement. The lateral forces are transferred as torsion forces to the rear frame by the wheel hub. If the hub bolt is too flexible or insufficiently pre tensioned, the frame wheel attachment flanges will be allowed to have slight separation from the hub ends during high lateral load. The frame itself will in this case be the major provider of system stiffness, and the system will be considered insufficiently rigid. In recent years awareness that the use of shear force load carrying through-bolt for locking the frame to the wheel improves rigidity has caused the solution to become de rigueur on derailleur gear hubs. Internally geared hubs would equally benefit from this added rigidity, the relevance of such a solution indicated by WO2009151334, which provides a new concept for design of internal gear systems, describing a cartridge-based hub system comprising a hub shell and a cartridge, the aforementioned selectively connectable, the cartridge potentially containing various forms of enclosed speed change mechanisms, one embodiment provided with a vertical shear force load carrying through-bolt solution. The present invention aims to further detail, specify, and enhance this concept.

Means for vertical shear force load carrying of the weight of the vehicle and rider are according to prior art provided in two basic variants. In each case the hub comprises an axle defining an axis of rotation, the first variant comprising hub-integrated or separable hub stubs or taps in both axial ends of the hub, of the same dimensions as the indentations standard on such frames, carrying the vertical shear forces, however not securing the hub to the frame. In one instance the hub is secured to the frame by powerful nuts, providing adequate rigidity for active riding in rough terrain. Removal of the wheel however, for example in case of a puncture, a tire change, maintenance, or for other reasons, is with such nuts complicated and time-consuming, requiring special tools, force, and in some instances, the competence of a specialist. Alternatively a quick release system can be used, comprising a non load-bearing Ø5 mm through-bolt, with a nut in one end and a cup operated by a quick release lever in the other, the lever operated from an open longitudinal position in an arc towards a 90 degree angle relative to the through-bolt, the cup contracting along the through-bolt towards the nut, and when the bolt is pierced through the load bearing shaft of the hub, the hub taps mounted correctly in the frame's hub mounts, and in this manner operated, the quick release system clamps the frame against the hub, and by this pre load overcomes the separation forces thus securing the hub to the frame, keeping the wheel and frame connected. As many other components used on mountain bikes of today, the Ø5 mm quick release was developed for use on road bikes. Such quick release systems are simple, provide adequate rigidity for regular transportation means or riding on paved roads, do not require the competence of a specialist, special tools, or much time for proper operation, yet due to the small diameter of the through-bolt and axial elasticity do not provide adequate rigidity or sufficient support against the higher lateral loads experienced during mountain biking.

The market has sought means for securing wheels to vehicle frames offering greater rigidity, which also have the benefit of ease of mounting and detachment, bringing us to the second variant of means for vertical shear force load carrying. Derailleur geared vehicles are increasingly seen with through-bolts of the same diameter as the recesses in vehicle forks and frames, where the through-bolt both carries the load of the vertical shear forces as well as rigidifies the rear frame by securing the vehicle frame against the hub. Given a rigid internal hub shaft and the frame flanges firmly clamped against the hub ends, the hub shaft and the frame will act like one continuous structure resulting in a less flexible and more rigid system. However, such through-bolts are bulky and require the hub to be specially designed, with a corresponding axial tunnel along the full length of the hub for the fitting of the bolt, and special bearings and seals. Initially this variant was applied to downhill bikes whose performance were dependent upon extraordinary sideways rigidity and lack of unintended wander, and therefore were provided with a front wheel through-bolt of Ø20 mm diameter and a rear wheel through-bolt of Ø12 mm, specially fabricated frame mounts, significant overlap, and firmly secured to the frame with nuts and bolts. In recent years however, through-bolt systems have become commonplace even in lower speed, technical disciplines such as all-mountain and trail riding, and even cross country, having a front wheel through-bolt of Ø15 mm or Ø20 mm diameter and a rear wheel through-bolt of Ø10 mm, a standard or specially fabricated frame hub mount, standard or wide overlap, and were secured to the frame with a quick release lever or simple nuts and bolts. When such through-bolts are provided with a quick release means for securement, the solution combines the user friendliness of a non shear force load carrying quick release system with the rigidity of a nut and bolt-secured axle system.

However, derailleur gear hubs require less comprehensive redesign for the integration of such a through-bolt solution than internally geared hubs with epicyclical gear mechanisms. To date, no internally geared hub featuring a detachable shear force load carrying through-bolt as well as gear mechanisms offering a sufficient number of different gear ratios and broad enough gear ratio width for the hub to substitute the commonplace derailleur gear system, has ever been realized.

Patent DE202010012075 describes a hub featuring internal gear mechanisms as well as a shear force load carrying through-bolt. Said hub is provided with means for bolt-on frame mounting requiring special tools and potentially the skill of a specialist for operation, although the use of a quick release solution with the hub is conceivable. However, the gear mechanisms are of a hybrid solution, comprising both an epicyclical unit and a standard rear derailleur gear system. The epicyclical unit offers only three different speeds, while inclusion of a derailleur system means the system compromises on robustness, reliability, and maintenance-requirements. The combination of a derailleur system with internal gear mechanisms enables only the elimination of the front derailleur, rather than the disposal of the whole flawed multispeed derailleur gear system. Academically speaking, the particular epicyclical structure provided puts the invention merely in the category of simple epicyclical gear hubs, as opposed to multispeed internally geared hubs having seven speeds or more, often in quite complicated epicyclical structures having advanced shift mechanisms and operation sequences. Integration of a massive through-bolt with internal gear mechanisms offering a sufficient number of speeds to fully substitute a derailleur gear is obviously beyond the scope of that invention. In fact, providing a multispeed internal speed change unit with a detachable shear force load carrying through-bolt requires a complete mechanical redesign of an existing multispeed unit, in practice the development of completely new epicyclical gear mechanisms. Significant portions of an axial internal tunnel that would need to be made available for a through-bolt to be fitted is in such hubs used for controlled axial or radial shift mechanisms such as pawls and dog clutches, as can be seen in e.g. U.S. Pat. No. 5,273,500, DE4142867A1, DE4203509A1 and DE4342347C1, and which are not easily moved out of the way to enable the use of a thick through-bolt. Conceiving and realizing an epicyclical internally geared hub with a sufficient number of gear ratios available to substitute in full the external derailleur system, provided also with a vertical shear force load carrying through-bolt, represents therefore a significant technical advancement over the epicyclical hub gear designs known in the art, substantiated by the fact that to date, and despite recent advancement in epicyclical gear train development, no manufacturer has successfully realized such a body.

Advancement in epicyclical gear train technologies has brought forward some high-performance multispeed hubs comprising sufficiently robust internal mechanisms for active use in rough terrain. A high performance multispeed internally geared hub with attractive overall characteristics is described in DE19720796A1, comprising a primary and a secondary epicyclical gear unit, the primary unit comprising four series of two mirrored sections with stepped planets, two ring gears, four sun gears, a primary shift mechanism with pawls selectively locking each sun and clutches selectively locking each set of planets to direct drive, the secondary gear unit featuring an epicyclical range gear with stepped planets providing direct drive or a full range reduction, operated by axially operated dog clutches.

A particularly relevant feature of said epicyclical structure is its large number of alternative gear ratios and total gear ratio width, on gear features making it the only realized internally geared substitute to the weak and primitive derailleur gear solution. Only few other epicyclical gear hubs with gear features achieving near this have been realized, most notable being said unit, DE4342347 and EP2008927. Shifting is achieved by mechanisms generally known such as a rotatable shift axle with a non-rotatable surrounding hub shaft supporting the epicyclical mechanisms, the pawls hinged on the outer axle, the rotatable shift axle having detents which operate the pawls, thus locking or releasing elements in the epicyclical structure. All axially operated dog clutches, also known in the art, are similarly shifted by the rotatable shift axle, which has circumferential tracks with an axial deviation, a rod being placed through an axial slot in the non-rotatable surrounding shaft such that when the shift axle is rotated, the rod is moved axially, thus operating dog clutches axially. If only one slot and rod is used per axial dog clutch, the ring will not operate evenly along its circumference, and rather be drawn or pulled by the rod from the circumferential region at where it abuts the ring. This may cause imprecise operation, ghost-shifting, and uneven wear.

To achieve even operation, it might be preferable to have multiple rods operating the ring, either two or three in total. However, as one slot in the load bearing shaft is required for each rod, the shaft will be more flexible than if there had been no such shift mechanisms and slots. To mitigate this material may be added, although such addition would cause an increase in weight. Furthermore, each rod requires also an axial slot on the rotatable shift axle for operation, and there are limitations as to how many such slots can be used if the axle is to rotate more than 360 degrees.

Furthermore, securement of the hub to the frame is achieved with either clumsy and difficult-to-operate nuts, or a thin and elastic quick release through-bolt. While the structure yields a multi-speed gear hub with a wide total transmission range and a relatively large number of speeds in even increments, and the design is suitable for active use in rough terrain, the combination of a hefty primary gear with twin stepped planets and a stepped range gear, such stepped epicyclical sections being adaptations of simple epicyclical sections and provided instead of such due to gear ratio constraints, results in a relatively large and weighty construction. The use of multiple automatic and controlled dog clutches and pawls, and traditional axial shift means, results in a dense and complicated construction with non-optimal operation. It is also costly and difficult to assemble, a detriment to massive market penetration.

An alternative epicyclical structure can be seen in patent DE19745419A1, which in essence comprises two epicyclical sections jointly connected, associated with a shifting or control device for selecting a desired gear ratio, the sun gear of one of the epicyclical gearing mechanisms joined non-rotatable to the hub shaft, the ring gear of the other section covering the first, and the shifting device including three rotatable about the hub shaft coupling elements on each side. Gear shift mechanisms for operation of the structure are myriad and known. The structure yields a simple and potentially robust multispeed gear hub, with merely two as opposed to four epicyclical series of the previously mentioned unit, while offering the same number of alternative ratios. However, the design is in its original form particularly complex, with its several rotating rings of different diameters and requiring a total of six different gear change mechanisms for proper operation of all gear ratios.

A specific embodiment and adaptation of the structure is described in DE102004011052A1, which is provided with a plurality of selectable and automatic pawls, shift mechanisms which to a person skilled in the art would be the first and obvious choice for providing a functional product of the aforementioned structure. The end result is a unit with a complex overall system, yet with performance on a sufficiently high level for urban use on even asphalt. The pawls require much axial space and are thus unsuitable for the construction of a multispeed internally geared hub with large gear width and the number of speeds necessary for riding in mountainous terrain. The sun gear which is non-rotatably connected to the internal shaft is realized by the traditional means of the shaft and sun gear being separately manufactured, after which the sun gear is permanently and non-rotatably mounted to the shaft, in effect causing the two to operate as a single unit throughout the lifespan of the product. Manufacturing these two items separately and joining them in this manner contributes in making it challenging to realize said epicyclical unit in combination with a shear force load carrying through-bolt. Furthermore, the mechanisms of this realized body take up as much space axially as a traditional three-speed hub, yet do not offer a sufficient number of speeds to be considered a substitute to derailleur gears on gear ratio alternatives.

From the above discussion it should be obvious that there is a need for improvements in the design of multispeed internally geared hubs and that the present invention as described represents a significant advancement over the current art.

SUMMARY OF THE INVENTION

An objective of the present invention is to provide an enclosed speed change gear unit, with key features enabling the unit to be considered attractive for active use in rough terrain. It should at least offer a large number of alternative speeds and a broad overall gear width, a compact and light weight design, a rigid interface to the vehicle, and user friendly means for hub to frame de/attachment.

A further objective is to provide a speed change gear unit having an shaft defining an axis of rotation, a hub shell rotatably mounted on the shaft, the shaft being securable to frames with at least one frame stay, a transmission changeable among several speeds between the shell and shaft, one drive gear in drive connection with an input element of the transmission, one output element of the transmission in connection with the shell, and a rotatable shift sleeve for changing between speeds. A relatively wide gear width and options for at least four different ratios in between is desirable, preferably a minimum of seven speeds in total.

The multispeed internally geared hub would in a preferred embodiment be provided with a massive, vertical shear force load carrying, quick release through-bolt, which without exposing the inner gear mechanisms of the hub is slidable into a hollow tunnel the whole axial length of the hub gear, as well as securable to the frame. The use of such through-bolt requires redesign of the epicyclical mechanisms and moving of the centrally located shift mechanisms radially towards the hub shell, which unless mitigated by a favourable redesign of the structure, causes an increase in hub casing size and overall weight. While definite measures of the minimum diameter sufficient for high performance are not available, it is widely considered that the Ø5 mm through-bolts which are typically used today for non load bearing quick release bolts are insufficiently rigid to be applied as shear force load carrying.

Similar empiricism has proven Ø10 mm or larger load bearing through-bolt diameters to be sufficient for the bolt to bear the load and strain of typical high performance rider application, and thus for the hub to designed such that the axle is shear force load carrying. Ø10 mm bolts offer an increase of pretension by 400% relative to a standard quick release axle of the same material, providing an adequate level of strength and rigidity for mountain biking. Future material improvements may enable smaller diameter bolts to be sufficiently rigid to be used as shear force load carrying. For lighter use an aluminum bolt can be used, offering an increase in the strength of about 160%. These are for certain types of riding considered sufficiently strong, and are therefore by certain riders applied to carry the shear force load. See FIG. 9, which shows a graph plotting bolt diameter against maximum possible pre-tension for two different materials of the bolt.

A still further objective of the present invention is to provide an epicyclical multispeed internally geared hub comprising a hub shaft non-rotatably mounted on the vehicle frame, a driver, an epicyclical gear system according to the principles described in DE19745419A1, with at least a first and a second epicyclical gear section, a sun gear joined non-rotatably to the hub shaft, a ring gear at least partially surrounding the epicyclical gearing system, a hub shell rotatably mounted to the hub shaft and downstream of the epicyclical gear mechanism, a shift mechanism connecting the driver to the gear system and the gear system to the driven unit, the gear shift control device enabling operation and selection of a desired gear ratio between the driver and the hub shell and consisting of an actuator, a carrier, and the particular locking mechanisms selected. Either of the first or second epicyclical gear section can be of a simple or stepped configuration, as this is known in the art, see e.g. DE102004011052A1. The application of other epicyclical structures are also conceivable, such as the traditional one of several stepped planets mounted in series, offering 8-14 speeds, operated by traditional pawls or axial dog clutches.

To make space for a through bolt in a multispeed unit with said epicyclical structure, a redesign may be needed, encompassing integration of elements of the epicyclical gear system, such as sun wheels with the load bearing shaft of the epicyclical system, wherein the shaft and the sun gear is manufactured in one piece. The outer edges of the sun gear teeth may in certain such embodiments have to be not larger than the diameter of the shaft. On the inside of the shaft however, the shaft could be reduced to allow for shift mechanisms on both axial sides of the machined sun gear and for lower weight.

The above described multispeed gear structure may be provided with a range gear. The range gear does not necessarily have to offer a repetition of the full range of the primary unit, nor does the epicyclical structure have to make use of all available speeds of the primary unit. Each planet may be simple or staged, single planets being preferred for axial and radial space considerations as well as ease of assembly. A simple planet range gear would have at least one planet meshed with the ring and sun gear in a straight radial line, while a stepped unit might have a sun gear meshed with a planet, non-rotatably connected to a different size planet, which meshes with a ring gear. The use of a simple planet range gear would offer a greater range of gear ratios in a more compact, lighter in weight, and easier to assemble design. Yet achieving said objective by use of a smaller simple planet range gear is a major challenge, relative to using a more bulky and traditional stepped section. Indeed, achieving a functional multispeed epicyclical internally geared hub comprising both said primary structure and a range gear, given the confinements of axial space available, is in itself obviously a major engineering challenge. This primary structure has several circumferentially rotating rings and a set of complex shifting mechanisms requiring space axially and radially for operation and the range gear also requires availability of axial space. Current realized embodiments of said primary section do not encompass a range gear mechanism, yet their inferior structures take up all axially available space and leave nothing for expansion.

A multitude of different shift mechanisms and means for selective connection of gear elements are conceivable for application to said structure. Operation may be achieved by means of circumferential rotation of a shift axle, axial sliding of rods or other motions appropriate, and for locking the epicyclical elements generally known shift mechanisms such as radially operated pawls and axial dog clutches may be provided. The use of radially working pawls for locking one or more sun gears to the shaft limits the number of locking positions per revolution of the sun gears, normally to less than 10 different positions per revolution. By the use of only axially operated dog clutches the gear unit may have a higher number of locking positions per revolution. Achieving more than 24 positions per revolution with such lock mechanisms is simple and preferable for the intended active use in rough terrain. Hence, such axial dog clutches mechanisms are preferred.

To achieve the aforementioned objectives, a preferred embodiment employs also a rotatable shift axle within the tunnel of a hollow main epicyclical shaft, such shaft being considered as non shear force load carrying against the bicycle frame while at the same time epicyclically load bearing, as the gear mechanisms are attached to or supported by said shaft while said shaft not bearing the weight of the rider and vehicle against the wheel. The rotatable shift axle is provided with cams of differing levels partially or wholly surrounding the shaft circumferentially, each cam pushing a circular ball or an otherwise free, non-hinged member radially through openings in the main epicyclical shaft, operating shift rings axially or radially. If operated axially, then the rings are angular with wedge shaped cross sections, and engaging or disengaging dog clutches between the epicyclical drive train and the driving and driven unit respectively. Each cam should have at least two different levels, enabling each cam and shift mechanism to operate and selectively lock or release more than one pair of shift rings. Said new shift mechanisms are capable of operating traditional epicyclical structures with two or more alternative gear ratios. For example, in a preferred embodiment it may be applied to the range gear, selectively engaging one pair of dog clutches axially, providing there shifting between only two different gear ratios. In the preferred primary structure, however, where torque is transferred through three rings rotating at different speeds circumferentially, it is conceivable that the shift cams are provided with several shift levels radially and that one such shift mechanism is applied to shift more than one pair of shift rings, one axially disposed shift mechanism thus providing more than two different gear ratios. Where multiple elements are to be operated in relatively speaking the same confined area of space, these elements may be displaced radially, although such elements may also be axially displaced. There might be several duplicates of said shift mechanism disposed at different locations axially within the gear hub, e.g. in the preferred embodiment one connecting the driver with any of the three different rotating rings, another connecting any of the three rotating rings with an intermediate axle, and yet another locking or releasing the range gear. Thus a hub with 14 or a greater number of speeds may be realized, operated by merely three, in many manners advantageous, shift mechanisms. The shift mechanisms are simple and small yet comprise relatively large and easy to handle components, thus are easy to manufacture and assemble, robust and reliable, and when combined with said primary structure and range gear, enables an epicyclical multispeed internally geared hub for the type of use envisaged which is also particularly suitable for mass manufacturing and mass penetration of the market. Other shift configurations than these preferred are conceivable, for example hinged pawls or rod operated axial dog clutches, which are well known in the art.

The invention is not limited to use within the hub of a wheel, and could for example be used as an intermediate shaft mechanism and arranged for this purpose at a location between the bottom bracket bearing and the hub of one of the two wheels of a bicycle at the behest of the bicycle designer, in which case the gear mechanisms could be connected via appropriate gear wheels, chains or the like on the driven side with the bottom bracket bearing, and on the driving side with a wheel, or within the bottom bracket bearing if such is found appropriate.

Detailed descriptions of preferred embodiments are presented bellow, with referral to the respective figures and models.

DESCRIPTION OF THE PREFERRED EMBODIMENTS

Figure 1:
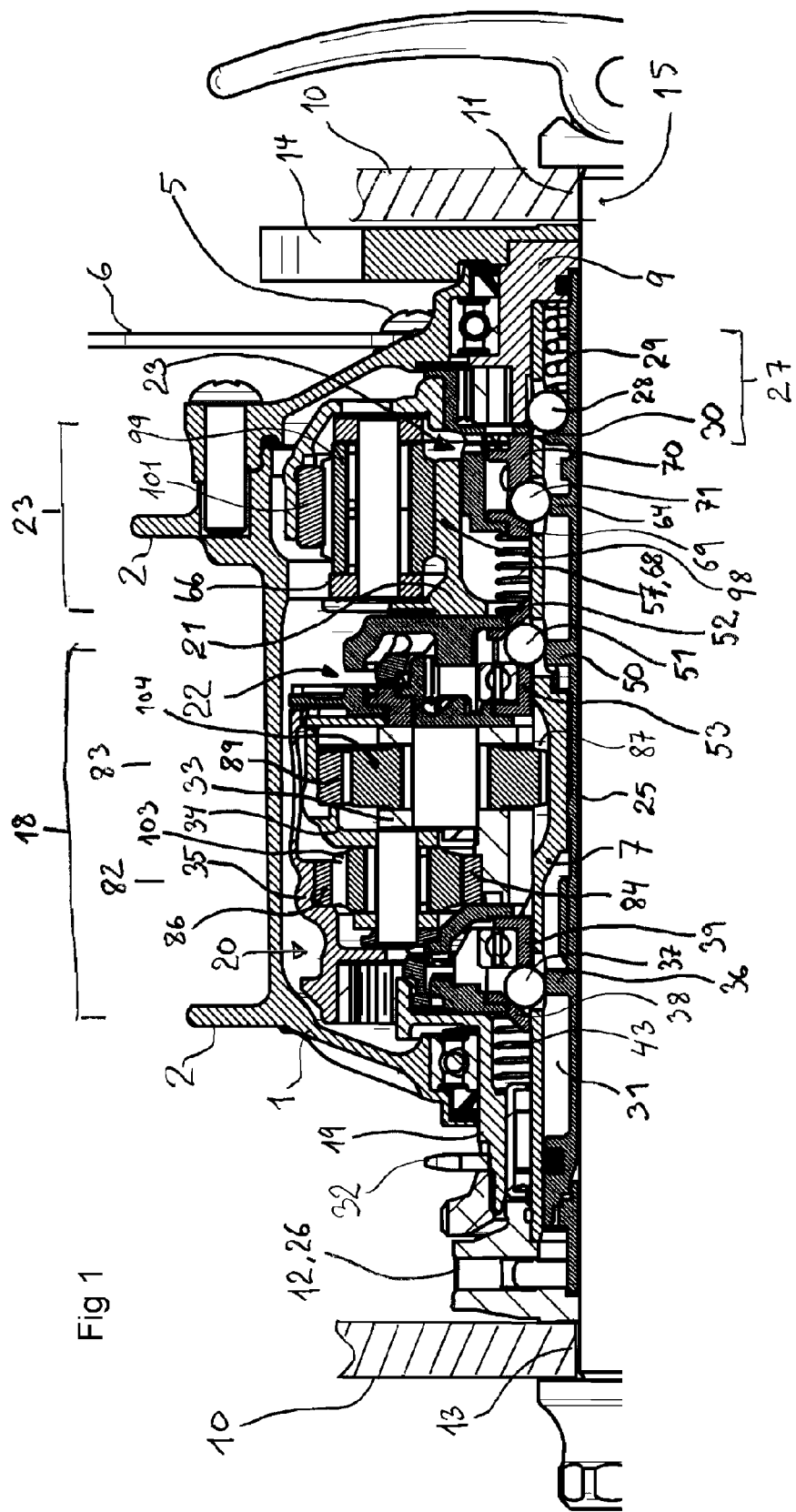
FIG. 1 shows a longitudinal sectional view of a multispeed gear in accordance with the invention.

FIG. 1 shows a preferred embodiment of the multispeed epicyclical speed change gear hub, comprising a hub shell 1 with spoke mounts 2, for spokes (not shown) of a wheel, rotatably mounted on a hollow load bearing internal shaft 7. Non-rotatably mounted to one end of the internal shaft 7 is a torque arm 14 that transfers torque from the internal shaft 7 to the bicycle frame 10. A clamp ring or bolts 5 are used for attachment of a brake disc 6 to the hub shell 1. At one end of the internal shaft 7 a left end piece 9 is non-rotatably mounted to the internal shaft 7. At the opposite end a right end piece 12 is non-rotatably mounted to the internal shaft 7. A load bearing, quick release through-bolt 15 is slided through the load bearing internal shaft 7.

The multispeed epicyclical speed change gear hub also comprises a primary epicyclical unit 18, an intermediate shaft 21, and a secondary epicyclical unit 23, wherein the primary epicyclical unit 18 is selectively connectable with a rotatable inbound axle 19 through the inbound speed change mechanism 20 and selectably connectable through the outbound speed change mechanism 22 to the intermediate shaft 21, and the intermediate shaft 21 is selectively connectable with a secondary epicyclical unit 23 by means of a speed change mechanism 65, transferring outgoing torque to the hub shell 1 through the outbound element 66 of the secondary epicyclical unit 23. The reaction-torque of the primary epicyclical unit 18 and the secondary epicyclical unit 23 is transferred to the internal shaft 7.

The quick release through-bolt 15 is slided through the internal tunnel of a shift axle 25, which in turn extends through the internal shaft 7. The through-bolt 15 quick release system buckles the frame 10 against the hub, and by this pre-tension overcomes the separation forces that might arise between the frame and parts, thus securing the frame to the hub, keeping the wheel and frame 10 rigidly connected.

Inbound torque is transferred from the bicycle's chain (not shown), turning a cog 32, which is non-rotatably connected to the rotatable inbound axle 19, transferring torque to the inbound speed change mechanism 20. The inbound speed change mechanism 20 transfers torque to either of an inner 33, a middle 34, or an outer 35 rotating element of the primary epicyclical units 18. Said elements 33, 34 and 35 are always rotating with the same ratio of rotational speed relative to each other, where the inner element 33 rotates with the lowest speed, and the outer element 35 with the highest speed.

Figure 5A:
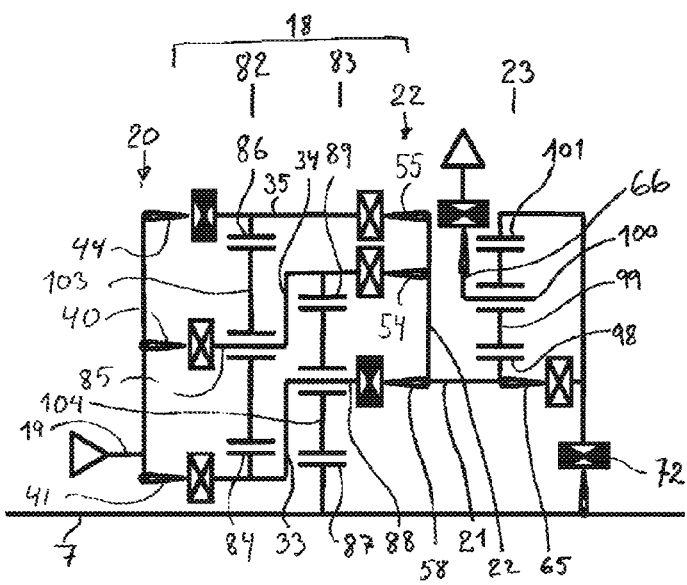
FIG. 5a shows schematically the preferred embodiment of the gear system of the invention.

Multiple embodiments are here conceivable; the first and preferred one is shown schematically in FIG. 5*a*. It consists of three epicyclical gear sections; a first epicyclical gear section 82, which has a sun wheel 84, a planet carrier 85, a ring gear 86 and planet gears 103, a second epicyclical gear section 83, which has a sun wheel 87, a planet carrier 88, a ring gear 89 and planet gears 104, and a third epicyclical gear section 23, which has a sun wheel 98, a planet carrier 100, a ring gear 101 and planet gears 99. The gear sections 82, 83, and 23 are coupled as follows; the sun wheel 84 of the first epicyclical gear section 82 is non-rotatably connected to the planet carrier 88 of the second epicyclical gear section 83, the ring gear 89 of the second epicyclical gear section 83 non-rotatably connected to the planet carrier 85 of the first epicyclical gear section 82, the ring gear 86 of the first epicyclical gear section 82 surrounding the second epicyclical gear section 83, and the sun gear 87 of the second epicyclical gear section 83 non-rotatably connected to the axle 7.

Alternative speed gear ratios are enabled by selectively connecting the driving unit 19 to the sun wheel 84 of the first epicyclical gear section 82, the epicyclical holder 85 of the first epicyclical gear section 82 or the ring wheel 86 of the first epicyclical gear section 82, and selectively connecting the ring gear 89 of the second epicyclical gear section 83, the ring gear 86 of the first epicyclical gear section 82 or the epicyclical holder 88 of the second epicyclical gear section 83, to the driven unit 21. The third epicyclical gear section 23 is coupled to the second epicyclical gear section 83 through the intermediate shaft 21, which is connected to the sun wheel 98 of the third epicyclical section 23, which meshes with at least one simple planet gear 99 of the third epicyclical section 23, which mesh with the ring gear 101 of the third epicyclical section 23, which is connected with the load bearing internal shaft 7 through an automatic freewheel coupling 72. The sun wheel 98 of the third epicyclical section 23 and intermediate shaft 21 are selectively connectable to the ring gear 101 of the third epicyclical section 23, locking the section to direct drive. The planet carrier 100 of the third epicyclical section 23 connects to the hub shell 1 through the outbound element 66 of the third epicyclical section 23.

Figure 5B:
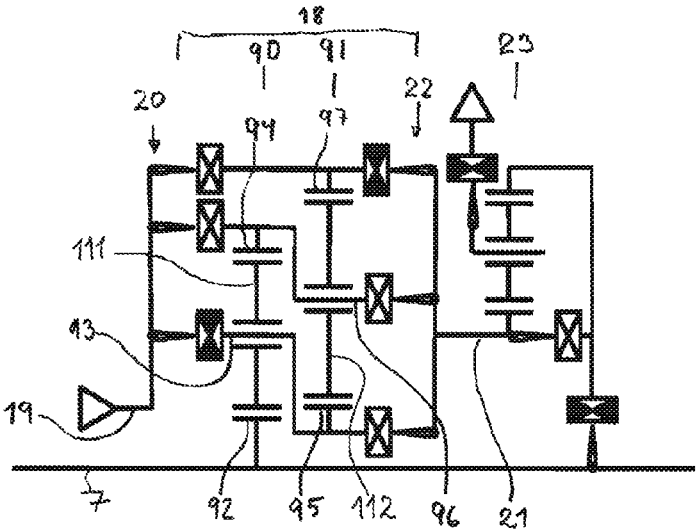
FIG. 5b shows schematically an alternative embodiment of the gear system of the invention, with the preferred secondary epicyclical unit and an alternative, mirrored primary unit.

A second embodiment is shown schematically in FIG. 5*b* and also consists of three epicyclical gear sections; a first epicyclical gear section 90, which has a sun wheel 92, a planet carrier 96, a ring gear 97 and planet gears 111, a second epicyclical gear section 91, which has a sun wheel 95, a planet carrier 96, a ring gear 97 and planet gears 112. The gear sections 90, 91 are coupled as follows; the sun gear 95 of the first epicyclical gear section 90 is non-rotatably connected to the axle 7, the ring gear 97 of the second epicyclical gear section 91 surrounding the first epicyclical gear section 90, the planet carrier 96 of the second epicyclical gear section 91 non-rotatably connected to the ring gear 94 of the first epicyclical gear section 90, and the planet carrier 93 of the first epicyclical gear section 90 non-rotatably connected to the sun wheel 95 of the second epicyclical gear section 91. Alternative speed gear ratios are enabled by selectively connecting the driving unit 19 to the ring gear 97 of the second epicyclical gear section 91, the ring gear 94 of the first epicyclical gear section 90 or the epicyclical holder 93 of the first epicyclical gear section 90, and selectively connecting the sun wheel 95 of the second epicyclical gear section 91, the epicyclical holder 96 of the second epicyclical gear section 91 or the ring wheel 97 of the second epicyclical gear section 91 to the driven unit 21. The third epicyclical gear section 23 is in this embodiment identical to the third epicyclical gear section 23 of the embodiment of FIG. 5.

Figure 5C:
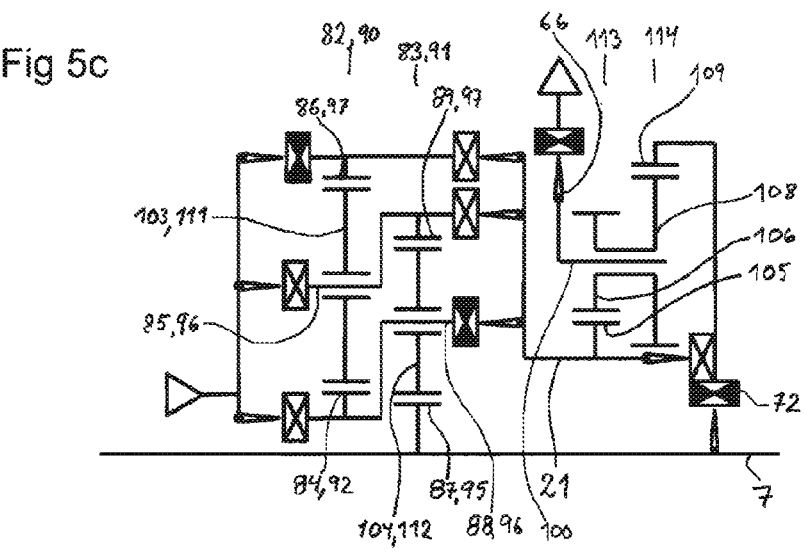
FIG. 5c shows schematically a further alternative embodiment of the gear system of the invention, comprising the preferred primary unit coupled with an alternative stepped secondary epicyclical unit.
Figure 6:
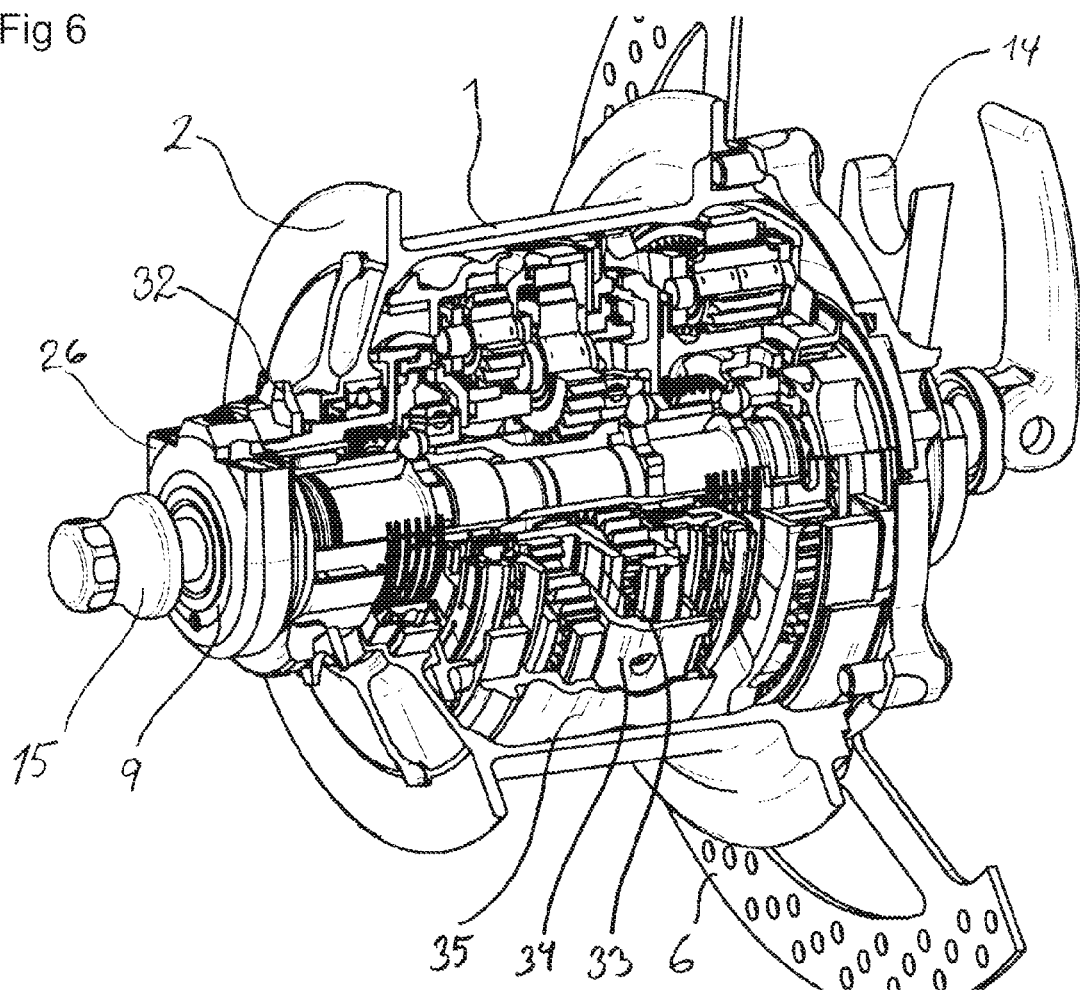
FIG. 6 shows a cut-away perspective, with certain elements being omitted for ease of visualization.

A third embodiment is shown schematically in FIG. 5*c*, and consists of four epicyclical gear sections; a first epicyclical gear section 82 or 90, has a sun wheel 84 or 92, a planet carrier 85 or 96, a ring gear 86 or 97 and planet gears 103 or 111, a second epicyclical gear section 83 or 91, which has a sun wheel 87 or 95, a planet carrier 88 or 96, a ring gear 89 or 97 and planet gears 104 or 112, a third 113 and fourth epicyclical gear section 114 with a third sun wheel 105 coupled to the second epicyclical gear section 83 or 91 through the intermediate shaft 21, the sun wheel 105 of the third epicyclical section 113, meshing with at least one planet gear 106 of the third epicyclical section 113, the planet gears 106 of the third epicyclical section 113 non-rotatably connected with the planet gears 108 of the fourth epicyclical section 114, meshing with the ring gear 109 of the fourth epicyclical section 114, which is connected with the load bearing internal shaft 7 through an automatic freewheel coupling 72. The sun wheel 105 of the third epicyclical section 113 and the intermediate shaft 21 are selectively connectable to the ring gear 109 of the fourth epicyclical section 114, locking the third 113 and fourth 114 epicyclical sections to direct drive. The planet carrier 100 of the third 113 and fourth 114 epicyclical sections connect to the hub shell 1 through the outbound element 66 of the third epicyclical section 113. Alternative input and output elements of the third and fourth epicyclical sections are conceivable where this is known in the art.

Figure 7:
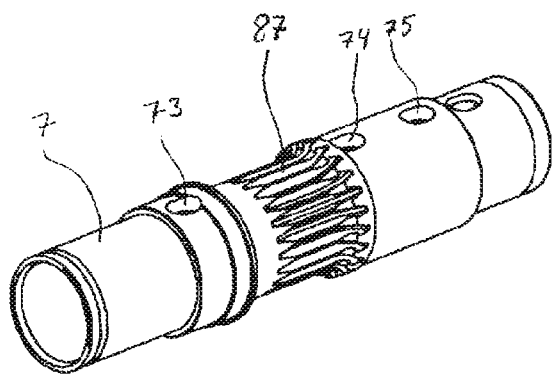
FIG. 7 shows the main shaft with integrated sun wheel.

As can be seen in FIG. 7, the sun wheel 87 is machined from the material of the shaft 7. Holes 73, 74, 75 through which shift balls 37, 51, 71 (shown in FIGS. 1, 2*c*, 3*c* and 4*c*) operate shift rings 38, 39; 52, 53; 69, 70 (shown in FIGS. 1, 2*c*, 3*c* and 4*c*) are not axial slots, rather relatively round if not circular penetrations of the shaft 7. In the preferred embodiment the shift balls 37, 51, 71 can move axially and radially yet not tangentially to the shaft 7. This will be explained in detail below.

Shift mechanisms according to the present invention will now be described. The shift mechanisms are schematically shown in FIGS. 5*a-c*. Since the shift mechanisms in FIGS. 5*a-c* work in a similar way, only the mechanisms of FIG. 5*a* will be explained in detail. Given this explanation it is apparent to the person of skill how the shift mechanisms of FIGS. 5*b* and 5*c* will work.

Referring to FIG. 5*a*, the shift mechanisms consist of an inbound speed change mechanism 20, an outbound speed change mechanism 22 and a secondary epicyclical control mechanism 65. The inbound change mechanism 20 has three members 41, 40, 44 which selectively transfer the rotation of the driving unit 19 to one of the following elements of the first epicyclical gear section 82: the sun wheel 84, the planet carrier 85 or the ring gear 86. The outbound change mechanism 22 has three members 55, 54, 58, which selectively transfer the rotation of one of the following elements: either the ring wheel 86 of the first epicyclical gear section 82, the ring gear 89 of the second epicyclical gear section 83, or the planet carrier 88 of the second epicyclical gear section 83, to the sun wheel 98 of the third epicyclical section 23.

Figure 8A:
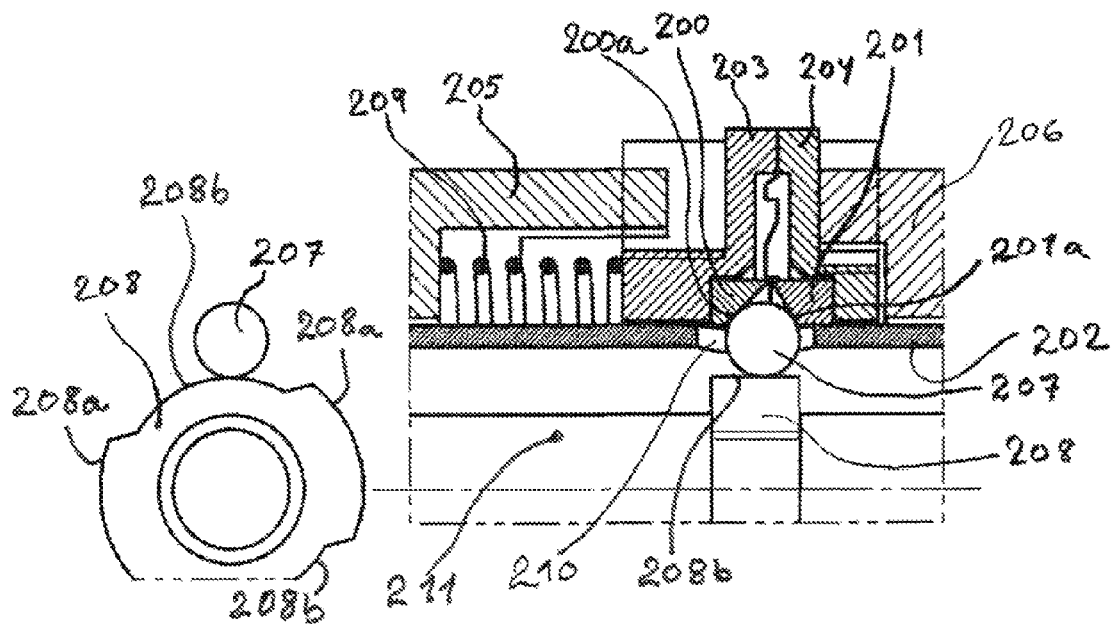
FIG. 8a shows a general illustration of the shift mechanisms in the lower cam position.
Figure 8B:
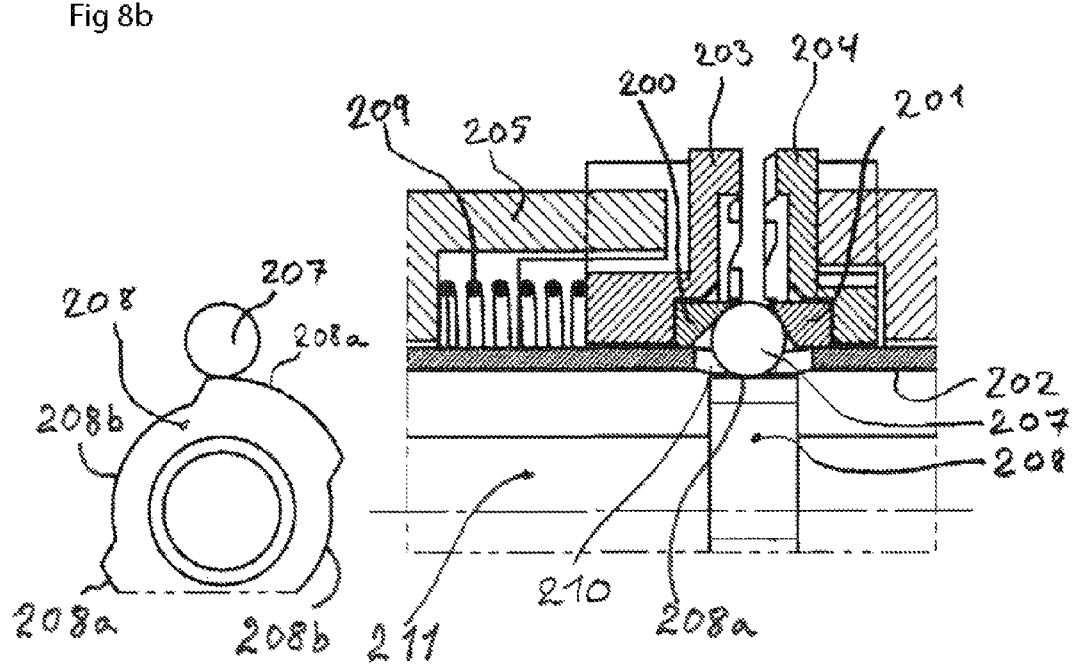
FIG. 8b shows a general illustration of the shift mechanisms in the higher cam position.
Figure 9:
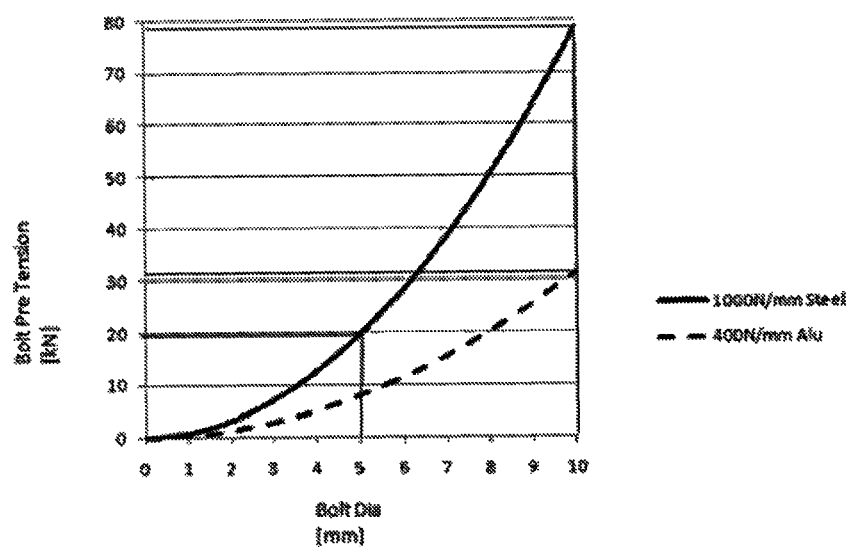
FIG. 9 shows a graph plotting bolt diameter against maximum possible pre-tension for two different materials of the bolt.

The speed change mechanisms will be described in detail. Referring to FIGS. 8a and 8b, the general principle of the shift mechanisms is first described. FIG. 8a shows the shift mechanism in a closed, locked position, FIG. 8b shows the shift mechanism in open, free position. Two wedge rings 200, 201 can either be free to move axially, or one of them can act as a reference and be axially fixed to a shaft 202, while the other will separate shift rings 203, 204. The two shift rings 203, 204 can either be of two way locking, dog type or freewheeling, one way locking. The angle or profile of the wedge surfaces 200a, 201a of the wedge rings 200, 201 can be varied to optimize shift characteristics. The wedge rings 200, 201 are preferably rotationally locked to the shaft 202. The wedge ring pair 200, 201 is separated by a shift body 207 in the form of a ball. The shift body 207 is axially positioned by a shift cam 208. The shift body 207 is tangentially positioned by a slot 210 in the shaft 202 but free to move radially and axially in the slot. The inbound shift ring 203 is rotatably locked to the inbound axle 205, but movable axially, and preloaded by a spring 209. The outbound shift ring 204 is rotationally locked to an outbound axle 206 and either axially free to move and preloaded by a spring in a similar manner as the inbound shift ring 203, or axially positioned by the outbound axle 206.

A cam 208 is mounted on a rotatable shift axle 211 and consists of two high levels 208a and two low levels 208b. Depending on the rotational angle of the shift axle 211, the shift body will rest on one of the high levels 208a or on one of the low levels 208b.

Regardless of the axial position of the adjacent components 205, 206 and the axial position of the wedge ring pair 200, 201, the shift body 207 will separate the two wedge rings 200, 201 and the shift rings 203, 204 by a specific axial distance, depending only on the radial position of the shift body 207 given by the cam height 208a, 208b, making the shift system independent of axial tolerances of the gear box component stack. The generally described shift mechanisms can be applied to shift in principle any kind of epicyclical gear system for pedally propelled vehicles, independent of e.g. number of speeds or structure of the epicyclical unit or the epicyclical unit's section.

Referring to a preferred embodiment and FIG. 1 the speed change mechanisms will in the following be described in greater detail. Within the internal shaft 7 is provided a selectively rotatable shift axle 25. The shift axle 25 is coupled to a shift actuator 26. To change gear ratios, the rotatable shift axle 25 is rotated between shift positions by means of the shift actuator 26. The operation of the shift actuator 26 is not explained here as this is based on technology which is per se known to the person of skill. An indexing mechanism 27 ensures that the shift axle 25 is positioned in the appropriate shift position to provide the selected gear transmission ratio. The indexing mechanism comprises a plurality of index balls 28. The index balls 28 are spring loaded by index springs 29, which push the index balls 28 against an indexing ring 30, which is permanently attached to the shift axle 25. When the balls 28 are in the detents of the indexing ring 30, the shift axle is stationary, and when the actuator rotates the shift axle 25, the index balls 28 move across the indexing ring 30, from one detent to another, until the shift axle 25 is again stationary. This ensures that the shift cams 36, 50, 64 of the rotatable shift axle 25 is positioned in the appropriate shift position to provide a relevant ratio, and eliminates the need for the rider shift operator (not shown) to have indexation. The shift axle 25 comprises an inbound shift cam 36, which acts on two inbound shift balls 37 (of which only one is shown in FIG. 1). It also comprises an outbound shift cam 50, which acts on two outbound shift balls 51 (of which only one is shown in FIG. 1). The primary epicyclical unit 18 is operated only by these inbound 37 and outbound shift balls 51.

Figure 2C:
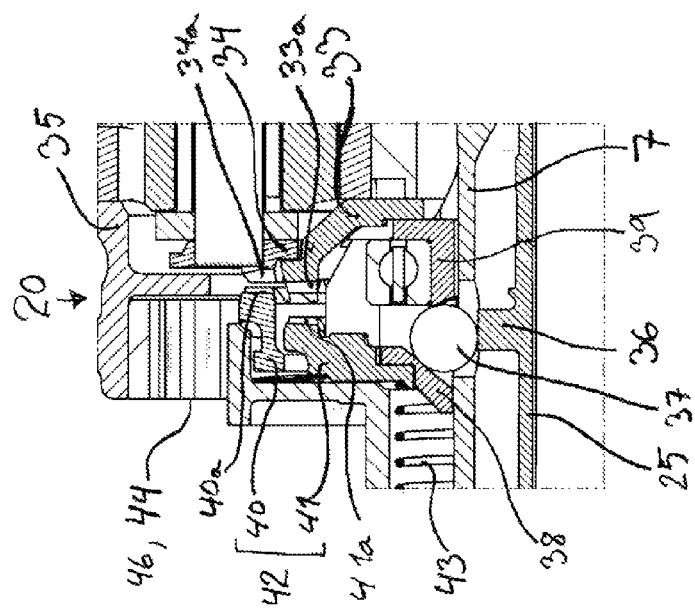
FIG. 2c shows the inbound shift mechanism in detail.
Figure 2B:
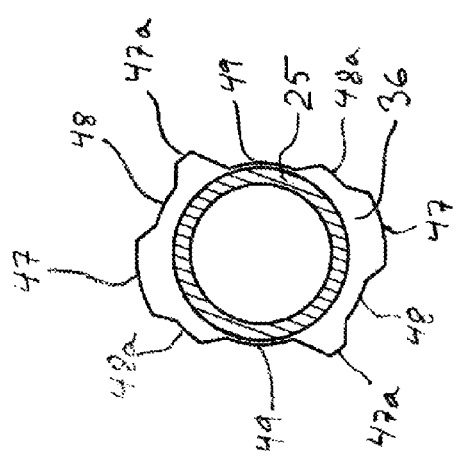
FIG. 2b shows a cross section of the shift axle across the inbound shift cam.

The inbound shift cam 36 is shown in detail in FIG. 2b, showing a cross section of the shift axle 25. The cam 36 consists of two diametrically opposite first high cam levels 47, two diametrically opposite second high cam levels 47a, two diametrically opposite first intermediate cam levels 48, two diametrically opposite second intermediate cam levels 48a and two diametrically opposite low cam levels 49.

Figure 3C:
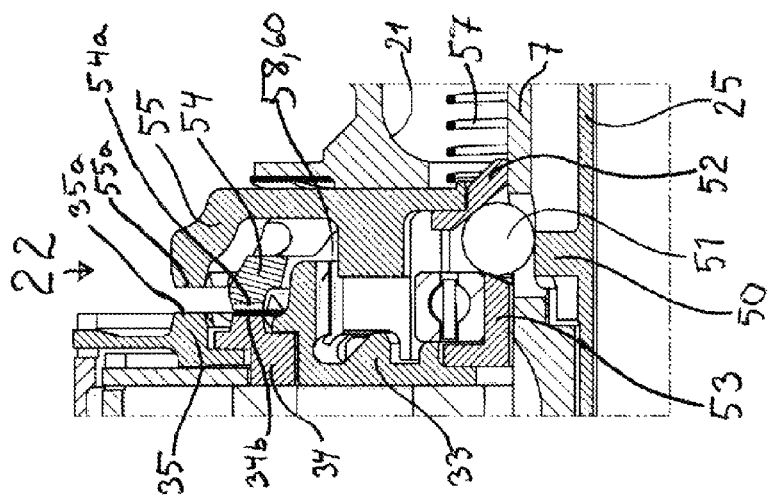
FIG. 3c shows the outbound shift mechanism in detail.
Figure 3B:
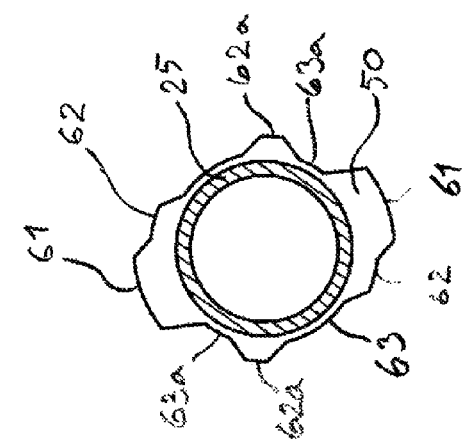
FIG. 3b shows a cross section of the shift axle across the outbound shift cam.

The outbound shift cam 50 is shown in detail in FIG. 3b, showing a cross section of the shift axle 25. The cam 50 consists of two diametrically opposite high cam levels 61, two diametrically opposite first intermediate cam levels 62, two diametrically opposite second intermediate cam levels 62a, two diametrically opposite first low cam levels 63 and two diametrically opposite second low cam levels 63a.

FIG. 2c shows the function of the inbound shift mechanism 20 in detail. The inbound balls 37 act against a first inbound shift ring 38 on one side and a second inbound shift ring 39 on the opposite side, to push these rings axially apart against the force of inbound control springs 43. The shift rings 38, 39 are not free to rotate relative to the main shaft 7. The first inbound shift ring 38 pushes against an inner shift element 41 of the inbound speed change mechanism 20. The inner shift element 41 has a toothed section 41a. The second inbound shift ring 39 pushes against the inner element 33 of the primary epicyclical unit 18. The inner element 33 has a toothed section 33a that meshes with the toothed section 41a of the inner shift element 41. Hence the action of the cams 36 will bring the inner elements 41 and 33 in and out of rotational coupling. The toothed sections 41a and 33a will be out of coupling when the inbound balls 37 rest against the intermediate cam levels 48 and 48a and the high cam levels 47 and 47a.

The inner shift element 41 pushes against a middle shift element 40, which has a toothed section 40a that meshes with a toothed section 33a on the middle element 33 of the primary epicyclical unit 18. The inner shift element 41 has an amount of play so that when the first inbound shift ring 38 pushes against the inner shift element 41, the inner shift element 41 moves a certain distance before it abuts the middle shift element 40. Thereby the rotational coupling between the middle shift element 40 and the middle element 33 is not broken until the balls 37 lies on top of the high levels 47 or 47a of the cams 36. The inbound shift elements 41, 40, 44 are all rotationally coupled to the driving unit 19.

FIG. 3c shows the function of the outbound shift mechanism 22 in detail. The outbound balls 51 act against a first outbound shift ring 52 on one side and a second outbound shift ring 53 on the opposite side, to push these rings axially apart against the force of outbound control springs 57. The first outbound shift ring 52 pushes against an outer shift element 55, which has a toothed section 55a that meshes with a toothed section 35a on the outer element 35 of the primary unit. The outer shift element 55 is brought out of engagement with the outer element 35 when the balls 51 lie against the intermediate levels 62 and 62a and the higher levels 61 of the cams 50. When the outer shift element 55 has been shifted a certain distance axially away from the outer element 35 it will abut a middle shift element 54 and carry this axially too. The middle shift element 54 has a toothed section 54a that meshes with a toothed section 34a on the middle element 34 of the primary epicyclical unit 18. The middle shift element 54 and the middle element 34 are out of rotational coupling when the balls 51 rests on the high levels 61 of the cams 50. When the rotation of the shift axle moves the different levels of the cams 36 and 50 to push the balls 37, 51 radially, the inbound shift rings 38, 39 and the outbound shift rings 52, 53 are pushed axially apart and depending on which level of the cams 36, 50 the balls 37, 51 lie on top of, pushes one or more of the elements 33, 41; 34, 40; 55, 35; 54, 34 out of rotational coupling.

Figure 2A:
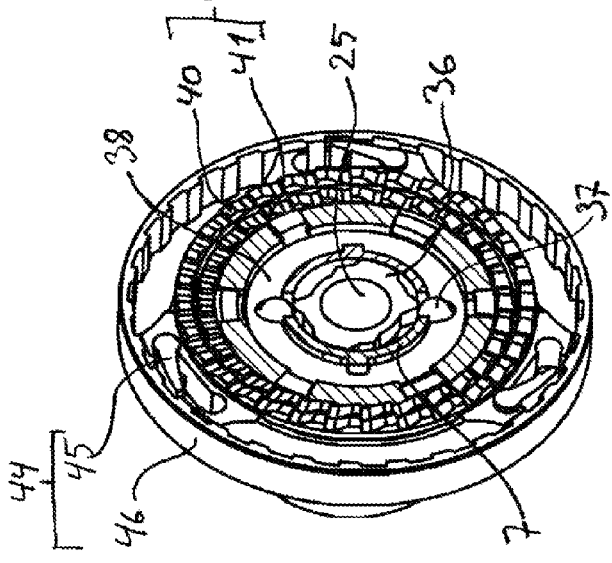
FIG. 2a shows a cross section of the inbound speed change mechanisms of the primary epicyclical unit.

Referring to FIG. 2a the selection of gearing ratio of the inbound speed change mechanism 20 with its three members 40, 41, and 44 will be explained. The inbound outer element 44 is fixedly connected to the outer element 35 of the primary epicyclical unit 18 and transfers torque when the other two inbound speed change elements 40, 41 are not in engagement. The inbound middle controlled speed change mechanism 40 and the inbound inner controlled speed change mechanism 41 have partial independent operation as they have freedom to move axially independent of the other but not radially or rotatably. The inbound shift cam 36 on the rotatable shift axle 25 moves the inbound shift balls 37 radially in three discrete levels, as explained above and shown in FIG. 2b. The shift sequence is repeated at 180 degrees rotation of the rotatable shift axle 25, so that two inbound gear shift cams 36 are non-rotatably, circumferentially, consecutively connected to the rotatable shift axle 25, each with two sets of three cam levels 47, 48, and 49 and one inbound gear shift ball 37 associated with each set of cam levels. When the shift balls 37 move radially away from the center axle they axially push apart two inbound shift rings 38, 39. The inbound speed change mechanism 20 comprises three lock functions, where two inbound controlled speed change mechanisms 41, 40 comprise controlled axially movable tooth couplings 42 closed by springs 43, and one inbound outer automatic freewheel coupling 44, which comprises pawls 45 and a toothed ring 46 (see FIG. 2a). The outer free wheel coupling 44 transfers torque when the inbound controlled speed change mechanisms 40, 41 are open. Alternatively, this mechanism 44 may be designed as an axially movable tooth dog clutch similar to those of the inbound controlled speed change mechanisms 41, 40.

Both inbound controlled speed change mechanisms 40, 41 have freewheeling option when they are engaged. When the inbound shift cam 36 on the rotatable shift axle 25 dictates that the inbound shift balls 37 are in their outer position 47 and the inbound shift rings 38, 39 are pushed furthest apart from each other, both of the inbound controlled speed change mechanisms 40, 41 are disengaged and the torque from the cog 32 is transferred through the inbound outer automatic free wheel coupling 44 from the inbound axle 19 to the outer rotating element 35 of the primary epicyclical 18. When the inbound shift cam 36 on the rotatable shift axle 25 moves the inbound shift balls 37 into their middle position 48, the inbound shift rings 38, 39 are moved together so that the inbound middle controlled speed change mechanism 40 of the inbound speed change mechanism 20 is engaged with the middle rotating element 34 of the primary epicyclical unit 18. The torque from the cog 32 is now transferred through the inbound middle controlled speed change mechanism 40 of the inbound speed change mechanism 20 to the middle rotating element 34 of the primary epicyclical unit 18. In this position, the inbound outer automatic free wheel coupling 44 is freewheeling.

When the inbound shift cam 36 on the rotatable shift axle 25 moves the inbound shift balls 37 into their inner positions 49 the inbound shift rings 38, 39 are moved into engagement with one another so that the inbound inner controlled speed change mechanism 41 of the inbound speed change mechanism 20 is engaged with the inner rotating element 33 of the primary epicyclical unit 18. The torque from the cog 32 is now transferred through the inbound inner controlled speed change mechanism 41 of the inbound speed change mechanism 20 to the inner rotating element 33 of the primary epicyclical unit 18. In this position, both the inbound middle controlled speed change mechanism 40 and the inbound outer automatic free wheel coupling 44 are freewheeling.

Figure 3A:
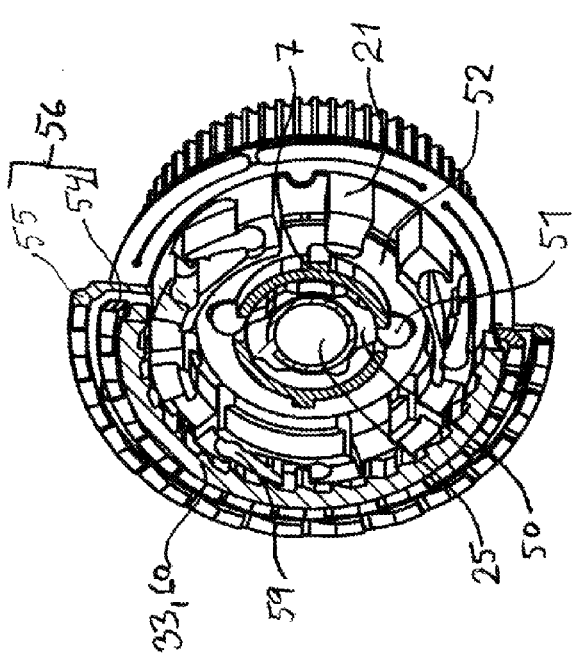
FIG. 3a shows a cross section of the outbound speed change mechanisms of the primary epicyclical unit.

FIG. 3a shows a cross section of the outbound speed change mechanism 22 with its three members 54, 55, and 58. The outbound inner element 58 transfers torque when the other two outbound speed change mechanisms 54, 55 are not in engagement. The outbound middle controlled speed change mechanism 54 and the outbound outer speed change mechanism 55 have partial independent operation as they have freedom to move axially independent of the other but not radially or rotatably. Outbound torque from either the inner 33, middle 34 or outer 35 rotating elements of the primary epicyclical unit 18 is transferred to the intermediate shaft 21 through the outbound speed change mechanism 22. The outbound shift cam 50 on the rotatable shift axle 25 moves the outbound shift balls 51 radially in three discrete levels. FIG. 3c shows a cross section of the outbound shift mechanisms 22 of the primary epicyclical unit 18, with the shift sequence repeated at 180 degrees rotation of the rotatable shift axle 25. Two outbound gear shift cams 50 are non rotatably, circumferentially, consecutively connected to the rotatable shift axle 25, each with three cam levels 61, 62, 63, and each associated with one outbound gear shift ball 51. When moving radially away from the shift axle 25 the shift balls 51 axially push apart two outbound shift rings 52, 53. The outbound speed change mechanism 22 comprises three lock functions, where two outbound controlled speed change mechanisms 54, 55, comprise controlled axially movable tooth couplings 56 (see FIG. 3a) closed by springs 57, and one outbound inner automatic freewheel coupling 58, which comprises pawls 59 and a toothed ring 60 (see FIG. 3a) transferring torque when the two outbound controlled speed change mechanisms 54, 55 are open. Alternatively, the mechanism may be designed as an axially movable tooth dog clutch similar to those of the outbound controlled speed change mechanisms 54, 55.

Both outbound controlled speed change mechanisms 54, 55 have freewheeling option when they are engaged. When the outbound shift cam 50 on the rotatable shift axle 25 dictates that the outbound shift balls 51 are in their outer positions 61 and the outbound shift rings 52, 53, are pushed furthest apart from each other, both of the outbound controlled speed change mechanisms 54, 55 are disengaged and the torque is transferred through the outbound automatic freewheel coupling 58 from the inner rotating element 33 of the primary epicyclical unit 18 to the intermediate shaft 21. When the outbound shift cam 50 on the rotatable shift axle 25 moves the outbound shift balls 51 into their middle positions 62 the outbound shift rings 52, 53 move together so that the outbound middle controlled speed change mechanism 54 of the outbound speed change mechanism 22 is engaged with the middle rotating element 34 of the primary epicyclical unit 18. The torque is now transferred through the outbound middle controlled speed change mechanism 54 of the outbound speed change mechanism 22 from the middle rotating element 34 of the primary epicyclical unit 18 to the intermediate shaft 21. In this position, the outbound automatic free wheel coupling 58 is freewheeling.

When the outbound shift cam 50 on the rotatable shift axle 25 moves the outbound shift balls 51 into their inner positions 63 the outbound shift rings 52, 53 are moved together so that the outbound outer controlled speed change mechanism 55 of the outbound speed change mechanism 22 is engaged with the outer rotating element 35 of the primary epicyclical unit 18. The torque is now transferred through the outbound outer controlled speed change mechanism 55 of the outbound speed change mechanism 22 from the outer rotating element 35 of the primary epicyclical unit 18 to the intermediate shaft 21. In this position, both the outbound middle controlled speed change mechanism 54 and the outbound automatic free wheel coupling 58 are freewheeling.

As shown in FIG. 1 the torque is transferred from the intermediate shaft 21 to a secondary epicyclical unit 23. Said gear shift mechanism is controlled by secondary epicyclical gear cams 64 on the rotatable shift axle 25. The secondary epicyclical gear cams 64a and 64b are shown in FIGS. 4a and 4b. The two cams 64a, 64b are dispersed 180° to one another along the circumference of the shift axle 25. Because the use of two gear shift balls 71 are preferred for shifting the secondary epicyclical unit 23, these are mounted slightly axially offset of each other, and are each operated by a dedicated cam 64a and 64b.

With 360 degrees rotation of the rotatable shift axle 25 the primary epicyclical unit 18 gears through its full gear series twice, one where the secondary epicyclical unit 23 is locked to direct drive and one where it is not.

Figure 4C:
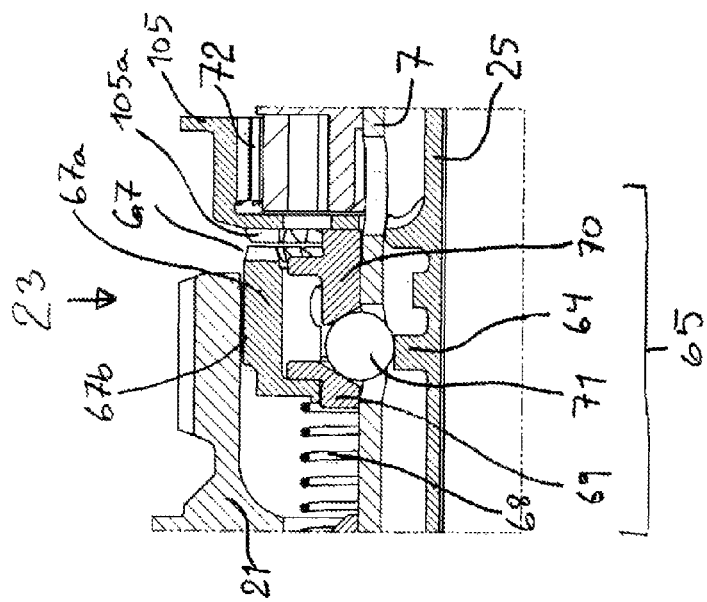
FIG. 4c shows the secondary epicyclical unit gear shift mechanism in detail.
Figure 4B:
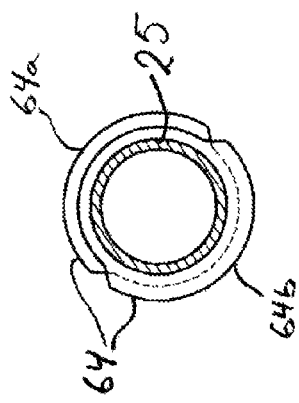
FIG. 4b shows a cross section of the shift axle across the secondary epicyclical unit cam.
Figure 4A:
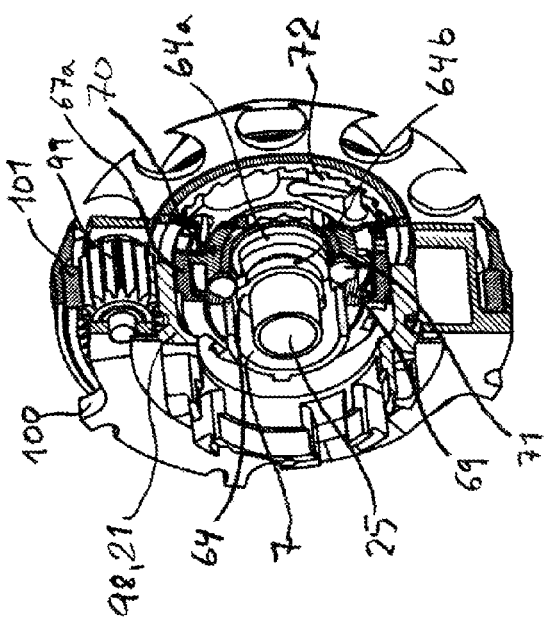
FIG. 4a shows a cross section of the secondary epicyclical unit change mechanism.

FIG. 4c shows the gear shift mechanism 65 of the third epicyclical section 23 in detail. It comprises a first shift ring 69 and a second shift ring 70, which are pre-tensioned towards each other by secondary unit gear springs 68. The first shift ring 69 abuts a coupling element 67a having a toothed section 67 that meshes with a toothed section 115a on an inner outbound element 115. The coupling element 67a is rotationally bound to the intermediate shaft 21 through intermeshing teeth 67b. The intermediate shaft 21 is further rotationally bound to the outbound element 66 of the secondary epicyclical unit 23.

The shift rings 69, 70 are axially moveable but rotationally bound to the intermediate axle 21 and a third sun gear 98 (see FIG. 5a) respectively. Referring to FIG. 5a, the secondary unit comprises a sun gear 98, meshed with planets 99, mounted in an epicyclical holder 100 and meshed with a ring gear 101. In the preferred embodiment, the planet gears 99 are of the simple type, while another embodiment would incorporate stepped planets.

The secondary epicyclical unit 23 is controlled by a gear control mechanism 65, shown in FIGS. 4a-c. This gear control mechanism decides whether speed is reduced or transferred directly from the intermediate shaft 21 to the outbound element 66 of the secondary epicyclical unit 23. The control mechanism 65 comprises tooth couplings 67, closed by springs 68 and opened by shift rings 69, 70, pushed apart by shift balls 71, axially moved by shift cams 64, non rotatably circumferentially connected to the rotatable shift axle 25. When the control mechanism 65 is closed, i.e. the toothed sections 67 and 105a are intermeshed, the secondary epicyclical unit 23 will rotate as an integrated unit with the intermediate shaft 21. A free wheel coupling 72 transfers the reaction torque from the secondary epicyclical unit 23 to the main shaft 7. Non-rotatably connected to the rotatable shift axle 25 are two secondary epicyclical shift cams 64, each with two shift balls 71, which are axially offset and rotated 180° to each other. The shift balls 71 operate against the two shift rings 69, 70.

When the secondary epicyclical unit 23 is not in operation and the torque is transferred directly from the intermediate shaft 21 to the outbound element of the 66, the free wheel coupling 72 will ensure that the secondary epicyclical unit 23 can freewheel around the load bearing internal shaft 7. The torque is transferred from the outbound element 66 of the secondary epicyclical unit 23 to the hub shell 1.

The invention has now been explained by means of a non-limiting embodiment. While only selected embodiments have been chosen to illustrate the present invention, it will be apparent to those skilled in the art from this disclosure that implementation of a number of variations and modifications to the invention as defined in the accompanying claims can be made without departing from the scope of said invention. For example, the size, shape, location or orientation of the various components can be changed at the behest of the inventor, components shown directly connected or contacting each other can have intermediate structures disposed between them, the functions of one element can be performed by multiple, and vice versa, the structures and functions of one embodiment can be adopted in another embodiment, and it is not necessary for all advantages to be present in a particular embodiment at any one time. Every feature which is unique from the prior art, alone or in combination with other features, also should be considered a separate description of further inventions by the applicant, and including the structural and/or functional concepts embodied by such a feature. The foregoing descriptions of the embodiments according to the present invention are provided for illustration only, and not for the purpose of limiting the invention as defined by the appended claims and their equivalents.

The invention claimed is:

1. A multi-speed gear system for a manually propelled vehicle, comprising:
   a gear unit with a hub casing;
   internal gear mechanisms;
   a shift axle provided with at least one multilevel cam, wherein the at least one multilevel cam radially operates at least one non-hinged shift operator for the gear unit; and
   at least one shift ring circumferentially arranged around a hub shaft, through which the shift axle extends, the at least one shift ring being operated axially by the at least one non-hinged shift operator, wherein the at least one shift ring has a wedge-shaped cross section.

2. The multi-speed gearshift system according to claim 1, wherein the at least one non-hinged shift operator has a rounded shape.

3. The multi-speed gearshift system according to claim 1, wherein the shift axle extends axially through a bore in the hub shaft and said at least one non-hinged operator is situated in a radial opening in the hub shaft.

4. A multi-speed gear system for a manually propelled vehicle with a frame with frame axle mounts for holding the multi-speed gear system, the multi-speed gear system comprising:
   a gear unit including a gear mechanism and a hub casing, the hub casing covering the gear mechanism;
   an internal shaft and a shift axle, wherein the shift axle is arranged inside the internal shaft; and
   a through-bolt extending through a tunnel of the shift axle of the gear unit,
   wherein the hub casing covers the gear mechanisms axially from end to end, and the through-bolt is detachable from the gear unit, arranged to bear directly against the frame axle mounts on both sides of the multi-speed gear system, and has a diameter of at least 10 mm so that the through-bolt carries a shear force load.

5. The multi-speed gear system according to claim 4, wherein the through-bolt has quick release means for coupling of the frame against the hub.

6. The multi-speed gear system according to claim 4, wherein the gear unit comprises an epicyclical gear system.

7. A multi-speed gearshift system for a manually propelled vehicle comprising:
a driving unit;
an epicyclical gear unit;
a gearshift mechanism;
a driven unit; and
a hub shell surrounding the gear unit,
the epicyclical gear unit having at least a first epicyclical gear section with a sun wheel being non-rotatably connected to a load bearing internal shaft, and a second epicyclical gear section with a ring gear at least partially surrounding the first epicyclical gear section; the gearshift mechanism comprising an inbound and an outbound gearshift section enabling change in gear ratio of the epicyclical gear unit,
wherein at least one axially operated clutch device is either non-rotatably locking the driving unit to one of the first and second epicyclical gear sections, or is not-rotatably locking one of the first and second epicyclical gear sections to the driven unit.

8. The multi-speed gearshift system according to claim 7, wherein the clutch is of a dog clutch type.

9. The multi-speed gearshift system according to claim 7, wherein the clutch device comprises either a one-way freewheeling device and two selectively operable clutches or at least two selectively operable clutches.

10. The multi-speed gearshift system according to claim 7, wherein the clutch elements are arranged radially in at least two different levels.

11. The multi-speed gearshift system according to claim 7, wherein the clutch comprises at least one selectively axially operated wedge-shaped shift ring.

12. The multi-speed gearshift system according to claim 7, wherein the clutch is spring biased towards a default position.

13. The multi-speed gearshift system according to claim 7, wherein the clutch mechanism is arranged around a load bearing hub shaft.

14. The multi-speed gearshift system according to claim 7, wherein at least one of the clutches has more than 10 engagement points.

15. A multi-speed gearshift system for a manually propelled vehicle comprising:
a driving unit;
an epicyclical gear unit;
a gearshift mechanism;
a driven unit; and
a hub shell surrounding the gear unit,
the epicyclical gear unit having at least a first epicyclical gear section having a sun wheel, and a second epicyclical gear section having a ring gear, the sun wheel of the first epicyclical gear section being non-rotatably connected to a load bearing internal shaft, the ring gear of the second epicyclical gear section at least partially surrounding the first epicyclical gear section; the gearshift mechanism comprising an inbound and an outbound gearshift section enabling change in gear ratio of the epicyclical gear unit,
wherein the epicyclical gear unit further comprises a third selectively operable multispeed epicyclical section arranged between the primary epicyclical unit and the hub shell, enabling at least one of the gear ratios of the primary unit to provide at least two different speeds.

16. The multi-speed gearshift system according to claim 15, wherein the third epicyclical section comprising at least one sun wheel meshed with a planet wheel, which either directly or through a stepped planet is meshed with a ring wheel.

17. The multi-speed gearshift system according to claim 15, wherein the third epicyclical section provides at least one of the gear ratios of the primary epicyclical section in direct drive and with a range reduction in speed.

* * * * *